United States Patent
Bo et al.

(10) Patent No.: US 9,292,107 B1
(45) Date of Patent: Mar. 22, 2016

(54) MOBILE TELEPHONE AS COMPUTER MOUSE

(71) Applicants: Rong Bo, Nanjing (CN); Mingqi Zhong, Nanjing (CN); Haibo Zhang, Nanjing (CN)

(72) Inventors: Rong Bo, Nanjing (CN); Mingqi Zhong, Nanjing (CN); Haibo Zhang, Nanjing (CN)

(73) Assignee: Trend Micro Inc., Tokyo (JP)

( * ) Notice: Subject to any disclaimer, the term of this patent is extended or adjusted under 35 U.S.C. 154(b) by 75 days.

(21) Appl. No.: 13/662,819

(22) Filed: Oct. 29, 2012

(51) Int. Cl.
*G06F 3/033* (2013.01)
*G06F 3/0354* (2013.01)
*G06F 3/0346* (2013.01)

(52) U.S. Cl.
CPC ............ *G06F 3/0354* (2013.01); *G06F 3/0346* (2013.01); *G06F 3/03543* (2013.01)

(58) Field of Classification Search
CPC ................ G06F 3/033–3/0346; G06F 3/0354; G06F 3/03543
See application file for complete search history.

(56) References Cited

U.S. PATENT DOCUMENTS

| | | | |
|---|---|---|---|
| 7,696,985 B2 * | 4/2010 | Machida | 345/169 |
| 2005/0078087 A1 * | 4/2005 | Gates et al. | 345/163 |
| 2008/0074391 A1 * | 3/2008 | Coe | 345/163 |
| 2008/0117168 A1 * | 5/2008 | Liu et al. | 345/158 |
| 2008/0122787 A1 * | 5/2008 | Huang | G06F 3/0346 345/158 |
| 2008/0228429 A1 * | 9/2008 | Huang et al. | 702/141 |
| 2010/0066677 A1 * | 3/2010 | Garrett et al. | 345/163 |

* cited by examiner

*Primary Examiner* — Yong H Sim
(74) *Attorney, Agent, or Firm* — Beyer Law Group LLP (57) ABSTRACT

A mobile telephone includes an active-pixel sensor in conjunction with a DSP chipset and a light source allowing the telephone to detect horizontal movement across a flat surface. When moved horizontally, the telephone detects relative position movement and transmits a new position to a nearby computer. The computer interprets this new position as a cursor control position and moves its cursor. The telephone is placed into a mode such that physical buttons or displayed buttons on a touch screen operate as a mouse click when pressed. The mouse click is interpreted by the telephone and transmitted to the computer to affect the mouse click. The telephone is also placed into a mode such that raising it from the flat surface indicates that a subsequent three-dimensional movement is interpreted as a mouse click. A shake, rotation or sharp movement is interpreted as a mouse click which is transmitted to the computer to implement the mouse click in conjunction with its cursor.

11 Claims, 7 Drawing Sheets

MOBILE TELEPHONE AS COMPUTER MOUSE

FIELD OF THE INVENTION

The present invention relates generally to a computer interface. More specifically, the present invention relates to use of a mobile telephone as a computer mouse.

BACKGROUND OF THE INVENTION

Computer users are now more than ever "on the go" and frequently carry a laptop computer while on the road or at home. When using a desktop computer that is more or less meant to remain in one location, a user will typically have access to a computer mouse that might be wired or wireless. When carrying a laptop computer, though, the user will typically forgo bringing (or forget to bring) a computer mouse mainly because the computer mouse adds bulk and is yet another item to carry. And, while many laptop computers have a touchpad that may be used with ones fingers as a computer interface, these touchpads are often not optimal, and do not work well with fingers that are in gloves, wet, greasy, etc. Many users would prefer to use a computer mouse with a laptop computer, but often do not have a computer mouse when using their laptop computer.

Most people who use a laptop computer will typically also have a mobile telephone. The technology of mobile telephones is becoming more integrated with our lives now that most mobile telephones include more sophisticated user interfaces such as touch screens, and technology such as GPS units, compasses, g-sensor/accelerometer, gyroscopes, etc. Attempts have been made to integrate a mobile telephone with a computer, but the results have not always been satisfactory.

Figure 1:
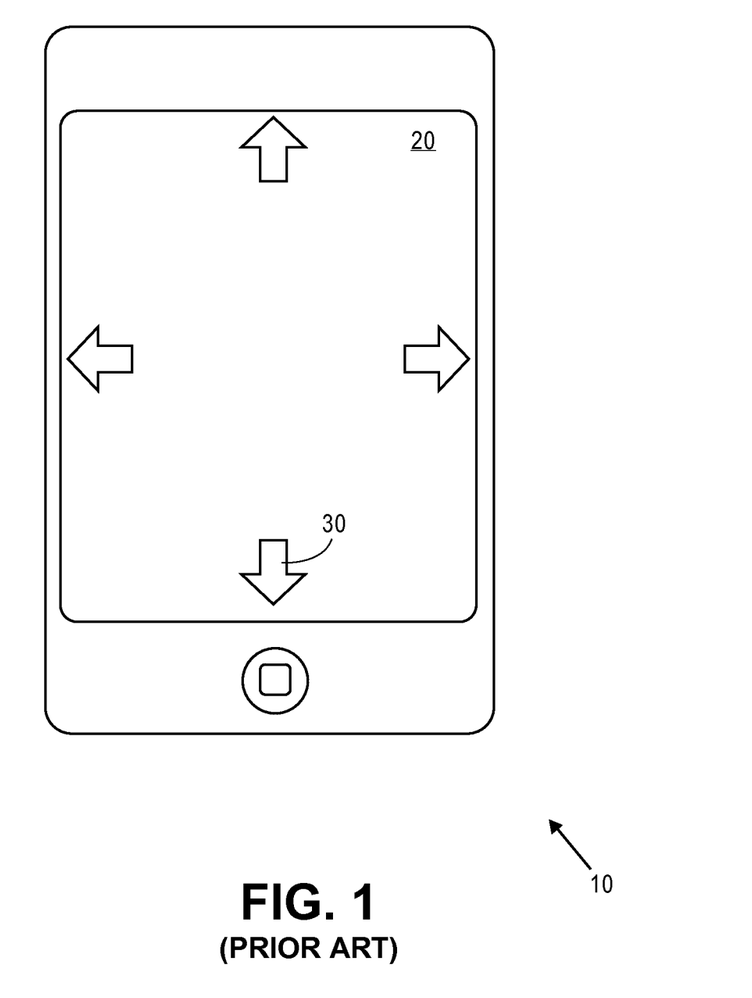
FIG. 1 illustrates a prior art mobile telephone having a touch screen.

FIG. 1 illustrates a prior art mobile telephone 10 having a touch screen 20. There are mobile telephone software applications that allow a user to control a cursor on a computer by using his or her finger on the touch screen. By moving his finger in the direction of one of the arrows 30, or by touching one of the arrows, the user may cause the computer cursor to move. But, these applications are designed just for fun and do not have any practical use. Since most laptop computers already include a touchpad for controlling a cursor with a finger, it is unlikely that the laptop user would use a touch screen on a mobile telephone since the touch screen has all the same disadvantages of the laptop touchpad. A touch screen on a mobile telephone, while useful for browsing e-mail messages or photographs, does not have the accuracy or sensitivity to control a computer cursor as well as a computer mouse could control the cursor.

Accordingly, recognizing that laptop users often will not carry a computer mouse (even though they would prefer to use one), and recognizing that prior art techniques are not satisfactory, a new technique and method are desired that would allow a computer user to easily control his or her computer.

SUMMARY OF THE INVENTION

To achieve the foregoing, and in accordance with the purpose of the present invention, a mobile telephone is disclosed that also functions as a computer mouse. Recognizing that mobile telephones incorporate more and more sensory technology, it is realized that a mobile telephone may be modified to wirelessly control a cursor on a nearby computer. Because the mobile telephone is similar in size to a traditional computer mouse, and may be held and moved in a similar fashion, a laptop user need not carry a computer mouse, need not worry about batteries for the mouse or charging it, etc.

In a first embodiment a mobile telephone is used to control a computer cursor by first establishing communication with the computer. The mobile telephone is positioned horizontally such that its sensor and light source are positioned downward. The telephone detects horizontal movement via its active-pixel sensor, determines a new relative position of the mobile telephone and sends this new relative position to the computer. The computer then updates its cursor position on its screen.

In a second embodiment a mobile telephone is used to transmit mouse clicks to a computer cursor by first establishing communication with the computer. The mobile telephone is positioned horizontally such that its sensor and light source are positioned downward. The telephone detects a mouse click via depression of a physical button or touch of an image of a button on its touch screen, translates this button click into a corresponding mouse click, and sends this mouse click information to the computer. The computer then adjusts information on its screen.

In a third embodiment a mobile telephone is used to transmit mouse clicks to a computer cursor by first establishing communication with the computer. The mobile telephone detects that the mobile telephone has been raised from a flat surface. After that detection, the mobile telephone detects that a particular three-dimensional movement has occurred and matches this movement with a predefined movement. The telephone then translates this detected three-dimensional movement into a corresponding mouse click, and sends this mouse click information to the computer. The computer then implements the mouse click on its screen.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, most laptop users will not carry a computer mouse. It is recognized, though, that mobile telephones incorporate sufficient technology that would allow the mobile telephone to sense its own position, movement, acceleration, etc., and then be able to transmit that information to a nearby laptop computer. By sensing movement in the hand of the user, the mobile telephone can function as a computer mouse and its transmitted information are interpreted by the computer as computer mouse movements and thus allowed to control the cursor on the screen of the computer. Various modifications, improvements and hardware are added to a traditional mobile telephone design, as well as new methods, in order to produce this new invention.

System Block Diagram

Figure 2:
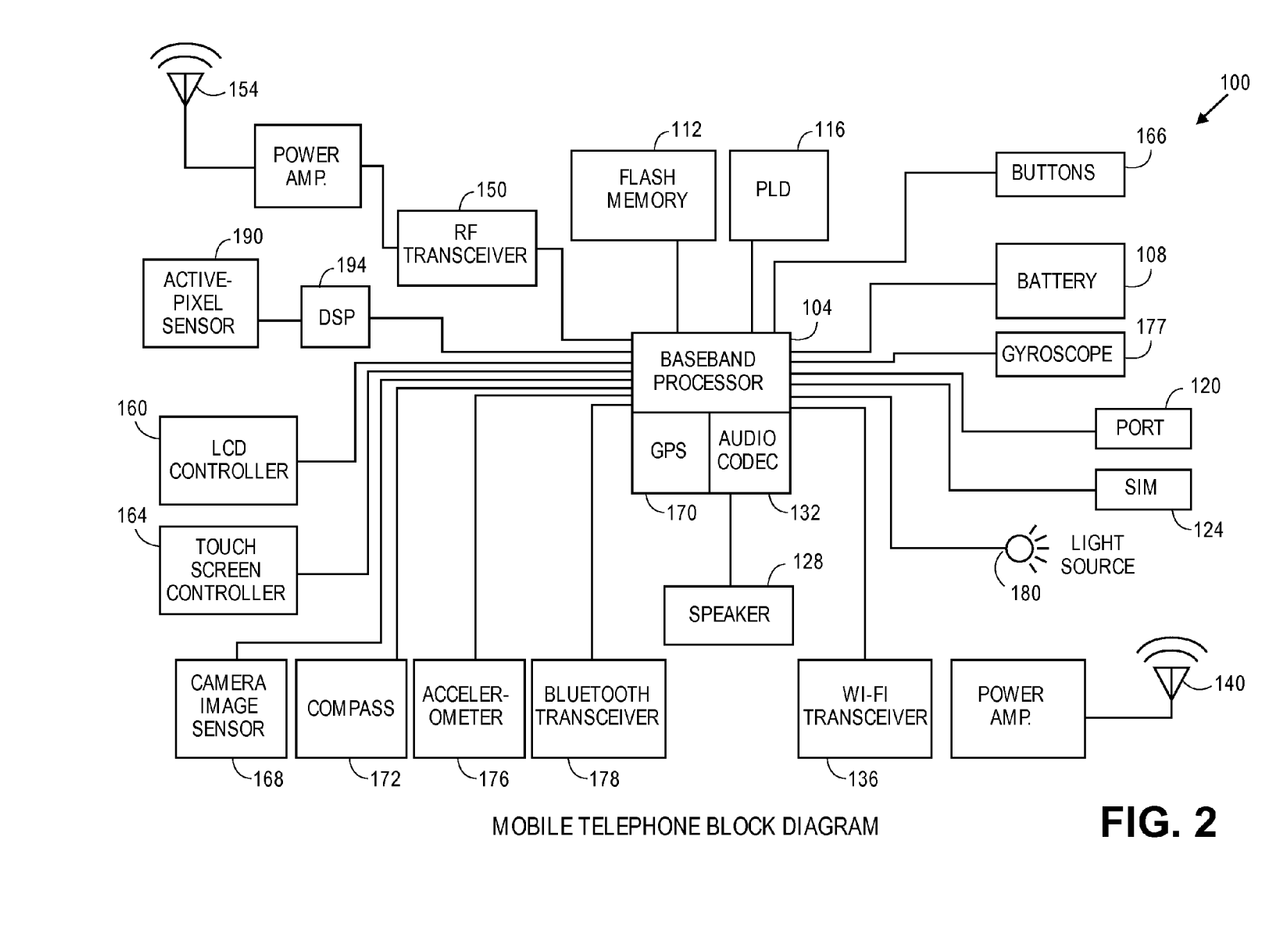
FIG. 2 is a mobile telephone block diagram having additional hardware used to implement the present invention.

FIG. 2 is a mobile telephone block diagram 100 having additional hardware used to implement the present invention. A baseband processor 104 is the heart of the mobile telephone, is powered by a battery 108 and uses memory 112 and a programmable logic device (PLD) in order to control the telephone. The telephone includes numerous inputs and outputs such as a microphone (not shown), any number of ports 120 (such as a USB, micro-USB, microSD card, etc.), a SIM card 124, and a speaker 128 that uses an audio codec 132.

Internet connectivity is provided by a transceiver 136 (using, for example, a Wi-Fi protocol) and an antenna 140. Telephone communication is provided via RF transceiver 150 and antenna 154. The touch screen (not shown) on the face of the telephone is implemented via an LCD controller 160 and a touch screen controller 164. In addition to the capabilities of the touch screen, the mobile telephone may include any number of physical buttons 166 that also communicate with the processor. These buttons may include the single power button commonly found on Apple telephones, any "home" or "back" buttons, and other physical buttons commonly found on the front surface or side of a mobile telephone.

A camera (not shown) on the back of the telephone uses a sensor 168. Other sensory technology includes a GPS unit 170, an electronic compass 172, an accelerometer 176, and a gyroscope 177, all of which may be implemented as known to those of skill in the art. For local communication, the telephone may use a Bluetooth transceiver 178; any nearby desktop computer, laptop computer, tablet computer or other computing device implementing the Bluetooth technology will be able to communicate with the mobile telephone. Although not shown, other local wireless technology may be used such as the near field communication (NFC) standard (assuming that the mobile telephone is close enough to the computer), the WiFi standard, the 27 Mhz Radio Frequency, the 2.4G standard, infrared technologies, etc. For Bluetooth, current standard technologies may be used; for 27 MHZ RF, 2.4G, or infrared, a common technique is to use a USB receiver plugged into the computer without a driver. Since most telephones use a USB cable for charging and data exchange, such a cable may also be used by this invention for wired communication.

Even though many mobile telephones include sensory components such as a GPS unit, a gyroscope and an accelerometer, these components are designed to detect relatively gross movements in three dimensions, and as such, are not accurate enough to control a computer cursor which requires detection of relatively fine movements in two dimensions. Therefore, specific hardware such as described below is added to the mobile telephone in order to increase its detection of fine movements.

Also included within the mobile telephone to help implement the present invention are a light source 180, an active-pixel sensor 190 and a digital signal processing (DSP) chipset 194. Light source 180 may be any suitable light source such as a red or blue LED, a laser, or other light suitable for reflecting off a desk, table or other flat surface such that the flat surface is sufficiently illuminated for the active-pixel sensor 190 to operate. Preferably, light source 180 is located on the underside of a mobile telephone (the side opposite the touch screen) so that when the mobile telephone is placed flat onto a surface the light source illuminates a small portion of that service. Located in close proximity (i.e., on the order of 1 cm) to the light source is an active-pixel sensor 190 that captures images from the flat surface. Sensor 190 may be a CMOS sensor or other sensor such as an IRFPA (hybrid infrared focal plane array).

Location and operation of the light source and the active-pixel sensor may be performed as is typically done for an optical computer mouse. As images are captured by the sensor 190 (on the order of hundreds of times per second), these images are sent to the DSP chipset 194 which detects patterns in the images, determines how the patterns have moved since a previous image, and from that determines mobile telephone direction, speed and acceleration, and then sends that information to the processor which forwards it to the computer. Typically, the DSP handles two-dimensional acceleration, while three-dimensional acceleration is handled by modules 176 and 177.

Alternatively, the DSP chipset simply determines the changing relative coordinates of the mobile telephone and transmits that relative position information to the processor 104 which can then forward the information on to a nearby computer. The computer can then move the cursor on the screen based upon coordinates from the DSP chipset 194.

Flow Diagrams

Figure 3A:
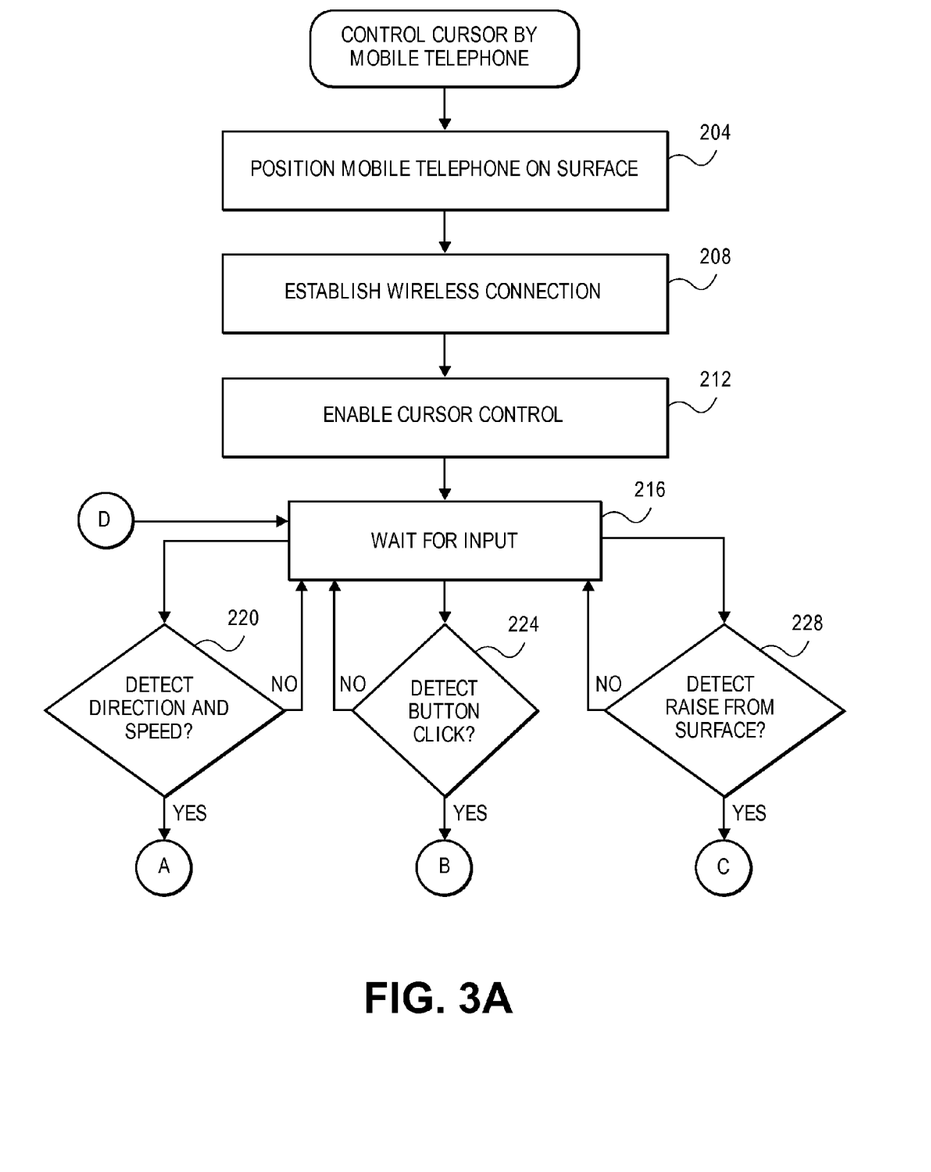
FIG. 3A is a flow diagram describing one embodiment by which a mobile telephone is able to control a cursor on a nearby computer screen.

FIG. 3A is a flow diagram describing one embodiment by which a mobile telephone is able to control a cursor on a nearby computer screen. In step 204 a mobile telephone incorporating hardware similar to that shown in FIG. 2 is positioned on a flat surface in working proximity to a computer. Any flat surface across which a computer mouse has traditionally been slid may be used. Preferably, the mobile telephone is positioned face up with its touch screen facing up and its light source and active-pixel sensor facing down. At this time, the user also executes a software application on the mobile telephone to put the mobile telephone into "mouse mode" which instructs the mobile telephone to operate as a computer mouse. This software application may be executed, for example, by choosing a symbol from the touch screen. When in mouse mode, the mobile telephone activates the light source on the underside of the telephone, enables the active-pixel sensor 190 to begin transmitting images, enables hard or soft buttons on the telephone to accept mouse input, and enables the accelerometer 176 and gyroscope 177 to begin capturing data. If the user only needs a two-dimensional mouse it is not necessary to enable modules 176 and 177.

In step 208 the mobile telephone establishes a wireless or wired connection with the nearby computer. The connection may use any suitable wireless technology such as Bluetooth, Wi-Fi, near field communication (NFC) or other such as mentioned above. Establishing a wireless connection using any of these protocols is known to those of skill in the art. Alternatively, a USB cable may be connected between the mobile telephone and the computer providing a wired connection. Other suitable wired connections and protocols may also be used.

In step 212 the mobile telephone sends a signal to the computer indicating that the telephone will be providing mouse input. In the case of Bluetooth, for example, a standard protocol may be used to indicate that the mobile telephone is now acting as a Bluetooth mouse. Alternatively, the user may execute commands or choose options on the computer to indicate that mouse input will now be received from the mobile telephone. In either case, the computer is now enabled to have mouse input received from the mobile telephone and to have its cursor controlled by the mobile telephone.

In one embodiment, because Bluetooth is a standard protocol, this means that in order to use Bluetooth technology a device (or computer) will be compatible with subsets of Bluetooth profiles. A typical Bluetooth profile is an HSP (headset profile). In order to act as a mouse, a device will be compatible with a Bluetooth HID profile. Many vendors (such as Microsoft and Logitech) manufacture Bluetooth mice. One benefit of using communication via Bluetooth is that a customer does not need to install anything. The device will tell the computer what kind of device it is during initialization.

For other protocols, similar to a normal wireless mouse, the computer will prompt for confirmation of connection after enabling the device. Or, for example, a driver is written for the computer to enable the computer to capture mouse data when using a Wi-Fi connection. For connections via Bluetooth or USB cable, the standard protocols used for these types of mice may also be used with the mobile telephone.

In step 216 the mobile telephone is ready to begin operating as a computer mouse and awaits any movement. In step 220 the user has moved the mobile telephone horizontally across the flat surface and the mobile telephone has detected a change in direction, acceleration or speed via its sensor 190. In step 224 the mobile telephone has detected that the user has pressed one of its physical buttons or a button symbol on its touch screen. In step 228 the mobile telephone has detected via its gyroscope and accelerometer that the telephone has been raised from the flat surface.

Figure 3B:
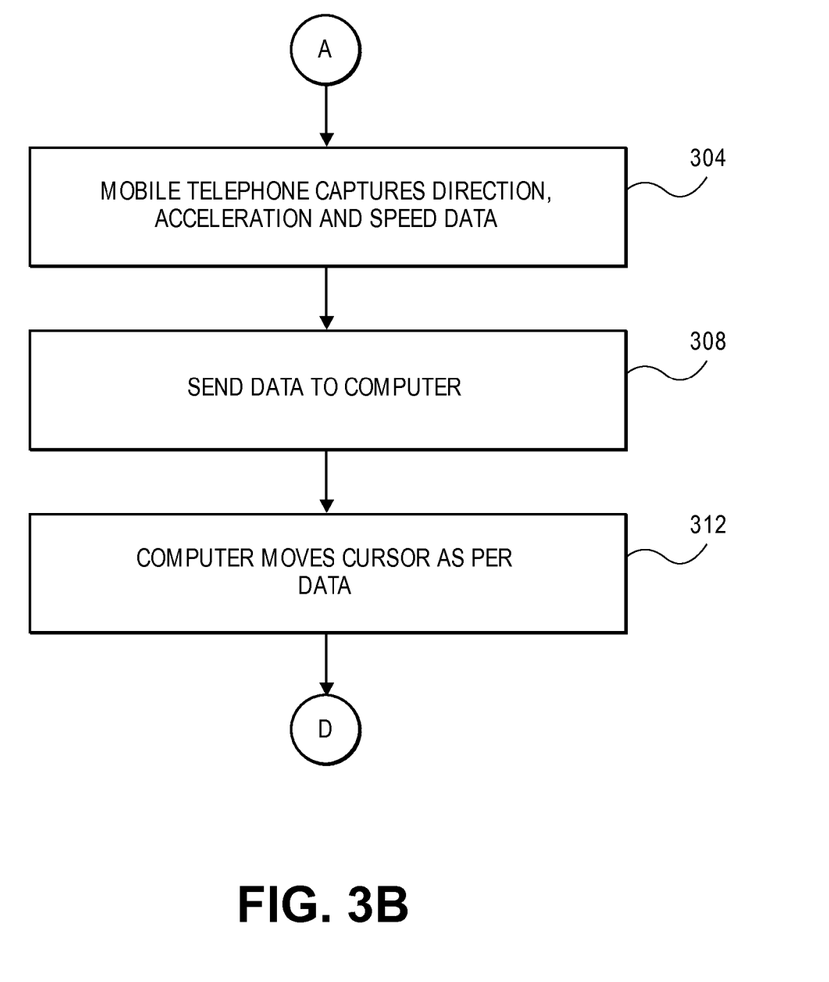
FIG. 3B is a flow diagram describing how the cursor is moved using the mobile telephone.

FIG. 3B is a flow diagram describing how the cursor is moved using the mobile telephone. Once the mobile telephone has detected a horizontal change in direction or acceleration, then in step 304 the mobile telephone captures this change in direction, acceleration or speed data via the DSP chipset. Alternatively, the DSP chipset more simply calculates a new relative position for the mobile telephone based upon the change in image pattern data it receives from the sensor 190.

In step 308 this new relative position data is sent via processor 104 to the nearby computer. The data is sent according to the protocol established between the mobile telephone and the computer, such as Bluetooth, WiFi, USB, etc. In step 312 the computer receives this new relative position data and moves the cursor on the screen according to the new data. The computer moves the cursor depending upon the communication technology used. For Bluetooth, for example, the computer knows that the device is a Bluetooth mouse; all data are packed using a standard format and are sent to computer. On the computer side this data is interpreted as mouse data by a standard Bluetooth driver, and the operating system will control the mouse as normal. For other technologies, a driver is installed on the computer and receives this mouse data; the driver interprets this data and translates signals to standard mouse tracking signals which are sent up to the mouse layer driver to control the cursor movement.

Figure 3C:
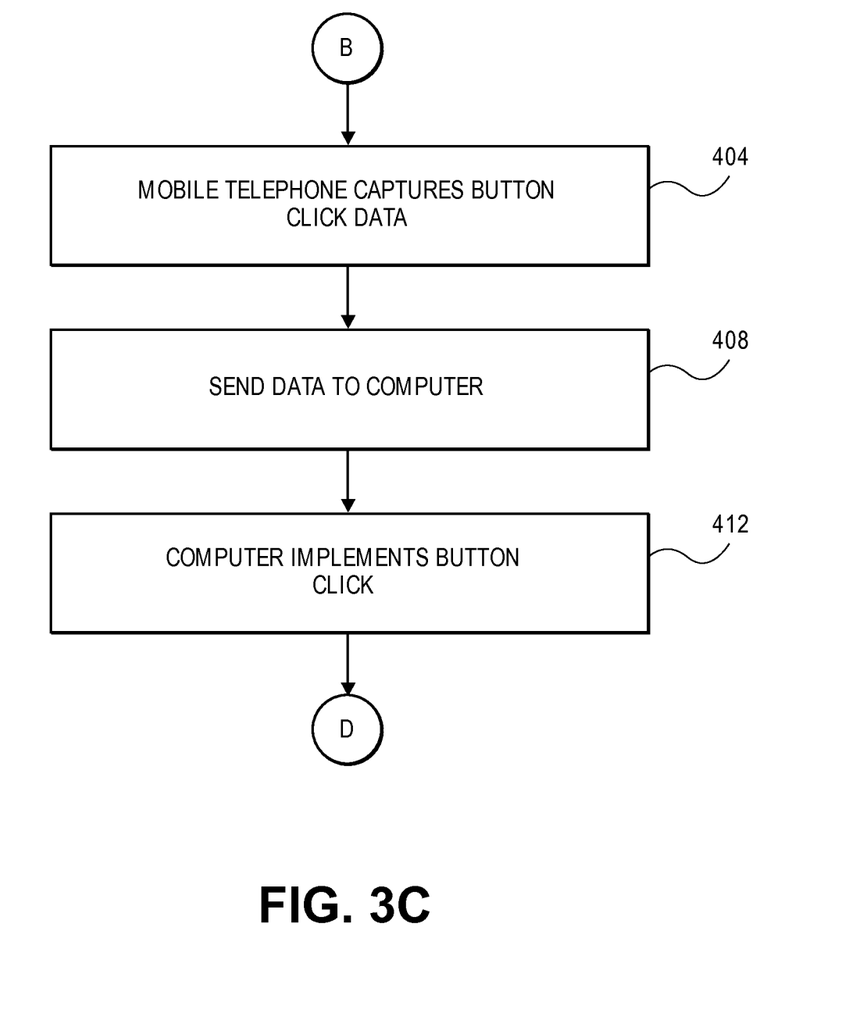
FIG. 3C is a flow diagram describing how a mobile telephone is arranged to capture button clicks by a user.

FIG. 3C is a flow diagram describing how a mobile telephone is arranged to capture button clicks by a user. Once the mobile telephone has detected a button click upon a physical button or a symbol on the touch screen, then in step 404 the mobile telephone captures this button click data via processor 104. For example, two physical buttons on the mobile telephone may operate in mouse mode to represent the "left" and "right" buttons on a traditional mouse. Or, buttons may be represented upon the touch screen of the mobile telephone and when the user touches one of these buttons this translates into a "left" or "right" click of a mouse button. In step 408 this captured button click data is sent via processor 104 to the nearby computer. The data is sent according to the protocol established between the mobile telephone and the computer, such as Bluetooth, Wi-Fi, USB, etc. In step 412 the computer receives this button click data and adjusts the cursor on the screen (or provides a new window, selects an item, opens a file, enables highlighting, etc.) according to the received button click data.

In one embodiment, the software application on the mobile telephone captures events corresponding to a user's click; the application may also allow the user to define a key relationship, for example, which key is mapped to the left button, and which key is mapped to the right button. Once a defined key mapping has been configured by the user with the software application, transmission of a "click" is performed depending upon the protocol being used for communication. Taking Bluetooth as an example, click events from the telephone are packed into a data structure of the Bluetooth HID profile and sent to the nearby computer.

Figure 3D:
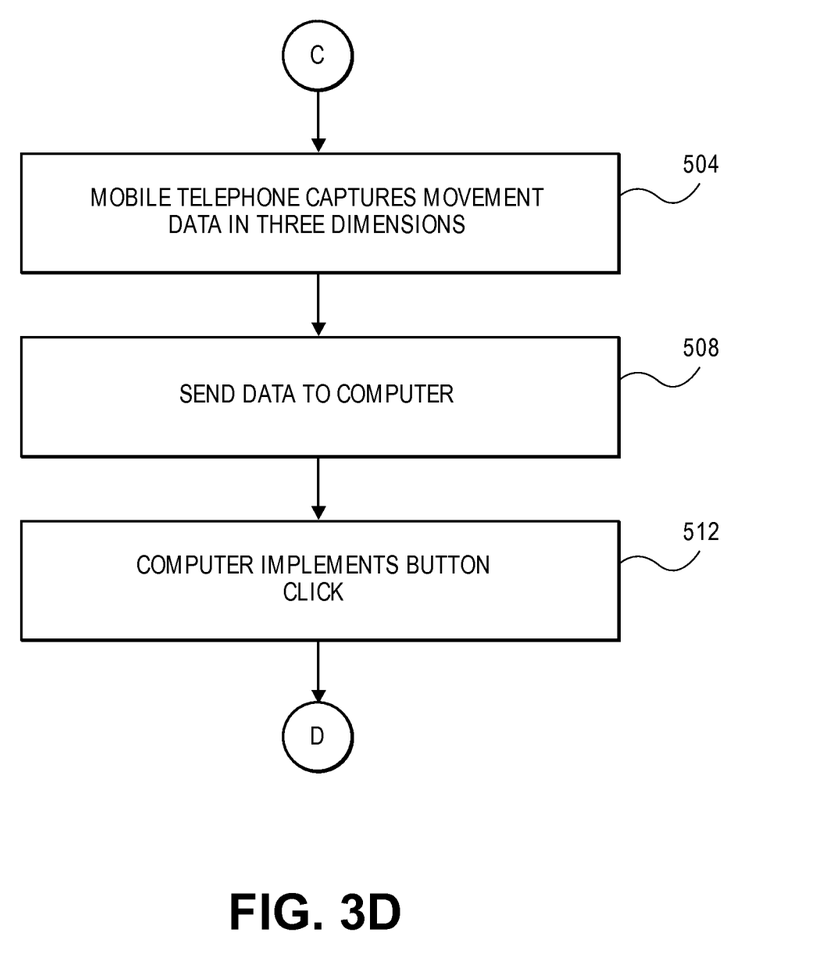
FIG. 3D is a flow diagram describing how a mobile telephone is arranged to capture three-dimensional movement to be interpreted as a mouse click.

FIG. 3D is a flow diagram describing how a mobile telephone is arranged to capture three-dimensional movement to be interpreted as a mouse click. Once the mobile telephone has detected via its gyroscope and/or accelerometer that it has been lifted from the surface, then in step 504 the mobile telephone captures any three-dimensional movement such as a vigorous shake, a rotation, a sharp movement in a particular direction, etc., using its gyroscope and accelerometer. One of skill in the art will be able to program an application on a mobile telephone to detect these types of three-dimensional movements. Next, the processor of the telephone interprets the detected three-dimensional movement as a mouse input. For example, a vigorous shake may be interpreted as a "left" mouse click, while a rotation vertically may be interpreted as a "right" mouse click. Or, a short, sharp movement in a horizontal direction may be interpreted as a "left" mouse click, while a short, sharp movement in a vertical direction may be interpreted as a "right" mouse click. Once interpreted, in step 508 this interpreted button click data is sent via processor 104 to the nearby computer. The data is sent according to the protocol established between the mobile telephone and the computer, such as Bluetooth, Wi-Fi, USB, etc. In step 512 the computer receives this button click data and adjusts the cursor on the screen (or provides a new window, selects an item, opens a file, enables highlighting, etc.) according to the received button click data.

Computer System Embodiment

Figure 4A:
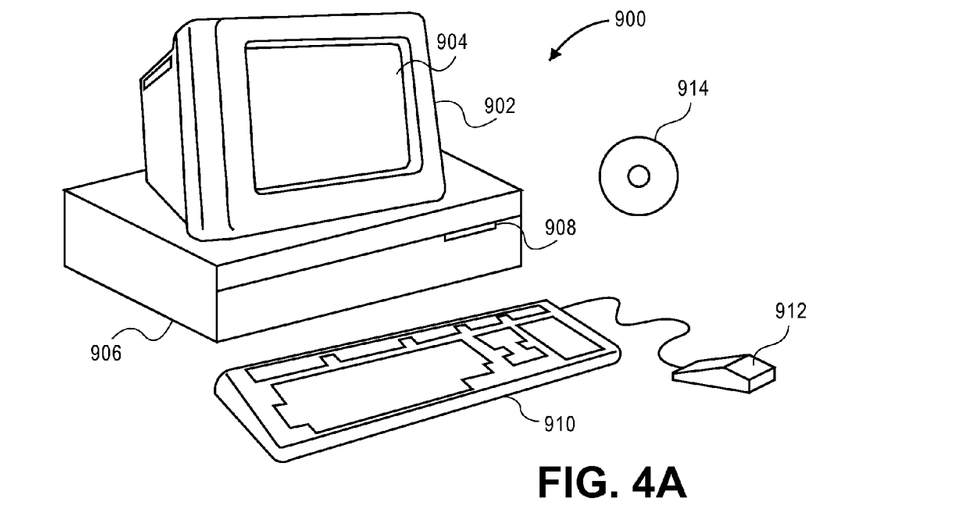
FIGS. 4A and 4B illustrate a computer system suitable for implementing embodiments of the present invention.
Figure 4B:
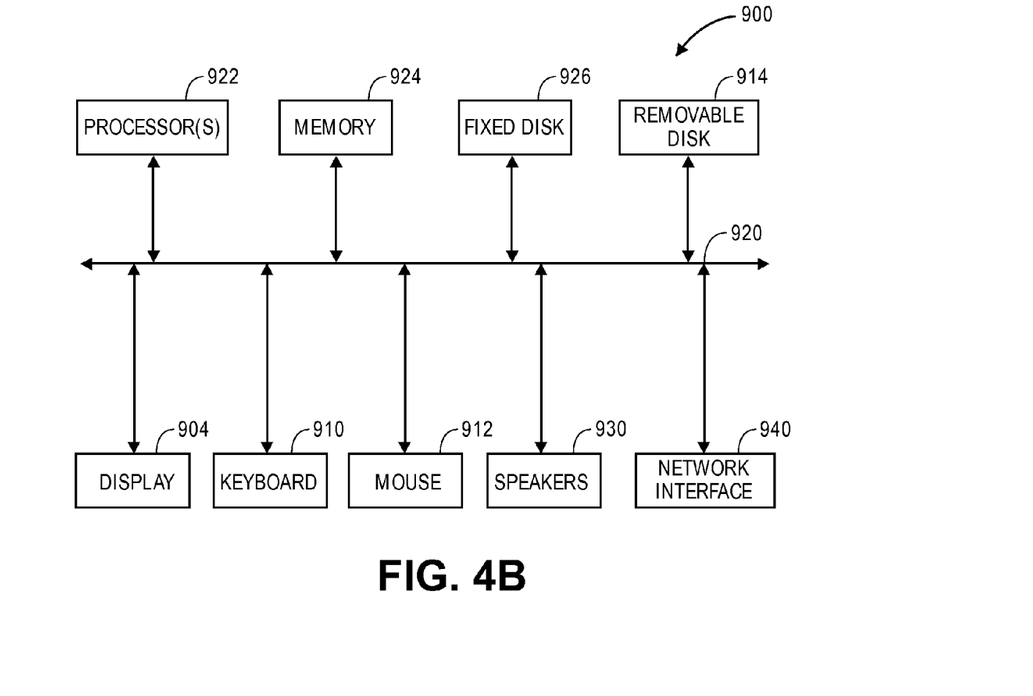

FIGS. 4A and 4B illustrate a computer system 900 suitable for implementing embodiments of the present invention. FIG. 4A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 4B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of controlling a computer cursor with a mobile telephone, said method comprising:
   establishing communication between a mobile telephone and a computer in close proximity;
   positioning said mobile telephone horizontally on a flat surface such that an active-pixel sensor and an associated light source of said mobile telephone are oriented downward toward said flat surface;
   detecting by said mobile telephone that said mobile telephone has been raised from said flat surface;
   detecting, by said mobile telephone, that said mobile telephone has undergone a first non-linear three-dimensional movement after said raising that matches a predefined non-linear three-dimensional movement wherein said first three-dimensional movement is distinct from said raising and wherein said mobile telephone does not interpret said raising as part of said first three-dimensional movement;
   after said mobile telephone detects that said mobile telephone has been raised from said flat surface, enabling said mobile telephone to detect said first three-dimensional movement and to match said first three-dimensional movement with said predefined non-linear three dimensional movement wherein said enabling is caused by said raising without requiring any additional input from a user of said mobile telephone;
   translating, by said mobile telephone, said matched first three-dimensional movement into a click of a first computer mouse button wherein said first computer mouse button is one of a left mouse button and a right mouse button and wherein said first three-dimensional movement is a sharp movement in a horizontal direction;
   sending said first computer mouse button click to said computer in close proximity; and
   implementing said first computer mouse button click in conjunction with a cursor of said computer;
   while said mobile telephone is raised above said flat surface, detecting by said mobile telephone that said mobile telephone has undergone a second non-linear three dimensional movement wherein said second three dimensional movement is different from said first three dimensional movement; and
   translating, by said mobile telephone, said second three dimensional movement into a click of a second computer mouse button, said second computer mouse button being one of said left mouse button and said right mouse button, said second computer mouse button being different from said first computer mouse button wherein said second three dimensional movement is a sharp movement in a vertical direction.

2. The method as recited in claim 1 wherein said detecting uses at least an accelerometer of said mobile telephone.

3. The method as recited in claim 1 wherein said established communication is wireless communication.

4. The method as recited in claim 1 further comprising:
   enabling cursor control by said mobile telephone by sending an enabling signal from said mobile telephone to said computer.

5. The method as recited in claim 1 wherein said mobile telephone is a functional mobile telephone.

6. The method as recited in claim 1 further comprising:
   executing a software application on said mobile telephone to put said mobile telephone into a mode wherein a processor of said mobile telephone understands that said raising from said flat surface is a precursor to input of a three-dimensional movement that is to be translated into a click of a computer mouse button.

7. The method as recited in claim 1 wherein said raising and said first three-dimensional movement are continuous.

8. The method as recited in claim 1 wherein said translation requires said first three-dimensional movement to immediately follow said raising.

9. The method as recited in claim 1 wherein said enabling operation is in response to said detection of said raising and enables said translation operation.

10. The method as recited in claim 1 further comprising:
before said raising, detecting by said mobile telephone that said mobile telephone is being moved along said flat surface while remaining in contact with said flat surface; and
translating said movement along said flat surface as a computer mouse movement used to change a position of said cursor.

11. A method of controlling a computer cursor with a mobile telephone, said method comprising:
establishing communication between a mobile telephone and a computer in close proximity;
positioning said mobile telephone horizontally on a flat surface such that an active-pixel sensor and an associated light source of said mobile telephone are oriented downward toward said flat surface;
detecting by said mobile telephone that said mobile telephone has been raised from said flat surface;
detecting, by said mobile telephone, that said mobile telephone has undergone a first non-linear three-dimensional movement after said raising that matches a predefined non-linear three-dimensional movement wherein said first three-dimensional movement is distinct from said raising and wherein said mobile telephone does not interpret said raising as part of said first three-dimensional movement;
after said mobile telephone detects that said mobile telephone has been raised from said flat surface, enabling said mobile telephone to detect said first three-dimensional movement and to match said first three-dimensional movement with said predefined non-linear three dimensional movement wherein said enabling is caused by said raising without requiring any additional input from a user of said mobile telephone;
translating, by said mobile telephone, said matched first three-dimensional movement into a click of a first computer mouse button wherein said first computer mouse button is one of a left mouse button and a right mouse button and wherein said first three-dimensional movement is a shaking motion;
sending said first computer mouse button click to said computer in close proximity; and
implementing said first computer mouse button click in conjunction with a cursor of said computer;
while said mobile telephone is raised above said flat surface, detecting by said mobile telephone that said mobile telephone has undergone a second non-linear three dimensional movement wherein said second three dimensional movement is different from said first three dimensional movement; and
translating, by said mobile telephone, said second three dimensional movement into a click of a second computer mouse button, said second computer mouse button being one of said left mouse button and said right mouse button, said second computer mouse button being different from said first computer mouse button wherein said second three dimensional movement is a rotation of said mobile telephone.

* * * * *